(12) United States Patent
Lim

(10) Patent No.: US 12,243,454 B2
(45) Date of Patent: Mar. 4, 2025

(54) APPARATUS, METHOD AND SYSTEM FOR DISPLAYING IMAGE

(71) Applicant: MOTOV CO., LTD., Incheon (KR)

(72) Inventor: Woo Hyeok Lim, Seoul (KR)

(73) Assignee: MOTOV CO., LTD., Incheon (KR)

( * ) Notice: Subject to any disclaimer, the term of this patent is extended or adjusted under 35 U.S.C. 154(b) by 309 days.

(21) Appl. No.: 17/904,648

(22) PCT Filed: Feb. 21, 2020

(86) PCT No.: PCT/KR2020/002519
§ 371 (c)(1),
(2) Date: Feb. 17, 2023

(87) PCT Pub. No.: WO2021/167139
PCT Pub. Date: Aug. 26, 2021

(65) Prior Publication Data
US 2023/0274676 A1     Aug. 31, 2023

(51) Int. Cl.
*G09G 3/00*       (2006.01)
*G06Q 30/0272*  (2023.01)
*G06Q 30/0273*  (2023.01)

(52) U.S. Cl.
CPC ......... *G09G 3/006* (2013.01); *G06Q 30/0272* (2013.01); *G06Q 30/0273* (2013.01); *G09G 2330/12* (2013.01)

(58) Field of Classification Search
CPC .............. G09G 3/006; G09G 2330/12; G06Q 30/0272; G06Q 30/0273
USPC .......................... 324/500, 600, 76.11, 760.01
See application file for complete search history.

(56) References Cited

U.S. PATENT DOCUMENTS

| | | | |
|---|---|---|---|
| 2013/0339992 A1 | 12/2013 | Oki | |
| 2014/0152786 A1* | 6/2014 | Nicholson | H04N 21/812 |
| | | | 348/61 |
| 2015/0082674 A1* | 3/2015 | Wagner | G09F 13/22 |
| | | | 40/544 |
| 2018/0114566 A1* | 4/2018 | Aoyama | H04N 13/332 |
| 2019/0313508 A1* | 10/2019 | Oda | B60K 35/00 |

(Continued)

FOREIGN PATENT DOCUMENTS

| | | |
|---|---|---|
| JP | 5369517 B2 | 12/2013 |
| KR | 20-0401354 Y1 | 11/2005 |

(Continued)

OTHER PUBLICATIONS

International Search Report issued in PCT/KR2020/002519; mailed Nov. 11, 2020.

*Primary Examiner* — Raul J Rios Russo
*Assistant Examiner* — Trung Q Nguyen
(74) *Attorney, Agent, or Firm* — Studebaker Brackett PLLC

(57) ABSTRACT

Apparatus, Methods and System for displaying a mobile image is provided. A mobile image display apparatus is provided. The mobile image display apparatus comprises a fixing unit having a means capable of being fixed to a moving means; a display for displaying an image, in which a checksum pattern for determining whether a screen is normally output is inserted; a processor for reproducing image data so that the image is displayed through the display; and a sensor for detecting an illuminance value of a position where the checksum pattern is displayed by the display.

10 Claims, 13 Drawing Sheets

(56) References Cited

U.S. PATENT DOCUMENTS

2020/0275091 A1* 8/2020 Heo ................... H04N 17/004
2021/0312881 A1* 10/2021 Kamekura .......... G06F 3/04162
2022/0130294 A1* 4/2022 Scheufler ............. G09F 21/048

FOREIGN PATENT DOCUMENTS

| KR | 10-1021305 B1 | 3/2011 |
| KR | 10-2018-0084504 A | 7/2018 |
| KR | 10-2020-0025576 A | 3/2020 |

* cited by examiner

APPARATUS, METHOD AND SYSTEM FOR DISPLAYING IMAGE

CROSS-REFERENCE TO RELATED APPLICATIONS

This application is a National Stage of International Application No. PCT/KR2020/002519, filed Feb. 21, 2020, the entire content of which is incorporated herein by reference.

BACKGROUND

1. Field

It relates to an apparatus, method, and system for displaying an image. More particularly, it relates to an apparatus attached to a moving means and for displaying an image while moving along the moving means, and a method and system for the apparatus displaying an image.

2. Description of the Related Art

With the development of a technology for a display device for outputting an image, devices installed outdoors to display digital information are increasing. A digital signage refers to a device for outdoor advertisement using a digital information display (DID). The digital signage is installed in subway stations, bus stops, apartment elevators, banks, etc. where there is a lot of floating population, and is used to alternately expose still images or videos by time.

In relation to the digital signage, the user terminal transmits a query to the signage management server based on information received from the beacon transmitter installed in a specific area, and the signage management server identifies the user terminal, and provides customized content between the signage terminals near the user terminal so that location-based user-customized target content is stored in the digital signage. The digital signage exposes advertisements by transmitting advertisement contents to the outside according to a predetermined time in a predetermined manner or by recognizing user terminals around the digital signage to transmit customized advertisement contents.

The advertiser should directly visit and confirm the position of the digital signage where the advertisement is transmitted, and then select whether to request the advertisement transmission, and the digital signage outputs the specified content at a fixed position. In addition, with the development of 4G mobile communication technology or wireless LAN technology, the control server can control the image output by the digital signage through the communication network.

However, due to the nature of digital signage, which is a display device installed outdoors, it is exposed to various outdoor environments, and thus an image may not be output normally due to a malfunction. From the standpoint of the advertiser who paid the advertisement cost for the image output, it is necessary to verify whether the image is not exposed as much as the advertisement cost due to a malfunction even though the desired image is normally output.

SUMMARY

A technical object is to provide a mobile image display apparatus, method, and system capable of displaying an image while being attached to a moving means and moving to various places regardless of a specific position.

Other technical object is to provide a method and apparatus capable of verifying whether an image to be exposed through a mobile image display apparatus is normally output.

Another technical object is to provide an image display apparatus with enhanced security so as to prevent an erroneous image from being output by an external intrusion.

Still another technical object is to provide a method and apparatus capable of calculating a reasonable advertisement cost by calculating an advertisement cost for a case, in which it is verified whether the output of an image is normally performed.

The technical objects are not limited to the objects mentioned above, and other objects not mentioned will be clearly understood by those skilled in the art from the following description.

According to the present disclosure, a mobile image display apparatus may comprises, a fixing unit having a means capable of being fixed to a moving means, a display for displaying an image, in which a checksum pattern for determining whether a screen is normally output is inserted, a processor for reproducing image data so that the image is displayed on the display and a sensor for detecting an illuminance value of a position where the checksum pattern is displayed on the display.

In some embodiments, the sensor is located in a front lower portion of a surface, on which the image is displayed on the display.

In some embodiments, the mobile image display apparatus may further comprises, a heat sink at an upper portion of the display.

In some embodiments, the mobile image display apparatus may further comprises, a memory for storing the checksum pattern, wherein the processor performs an update of the checksum pattern, and inserts the checksum pattern stored in the memory into the image data.

In some embodiments, the mobile image display apparatus may further comprises, a communication unit for receiving image data for displaying the image and update data for updating logic installed in an operating system for verifying the checksum pattern from a server, wherein the processor determines validity according to a pattern of the illuminance value by executing logic installed in the operating system, and stops reproduction of the image data in response to the pattern of the illuminance value being invalid.

In some embodiments, the mobile image display apparatus may further comprises, a micro controller unit for determining validity of a pattern of an illuminance value according to an embedded logic when the sensor detects the illuminance value, cutting off power supplied to the display if the pattern of the illuminance value is invalid, and delivering the illuminance value to the processor if the pattern of the illuminance value is valid.

In some embodiments, the mobile image display apparatus may further comprises, a communication unit for transmitting and receiving data with a server, wherein the processor determines whether the image is normally output based on the illuminance value, and transmits the determined information on whether the image is normally output to the server through the communication unit.

In some embodiments, a method for displaying an image using a mobile image display apparatus attached to a moving means may comprises inserting a checksum pattern for determining whether a screen is normally outputted into image data, displaying an image on the mobile image display apparatus by reproducing the image data, into which the checksum pattern is inserted detecting an illuminance value of a position where the checksum pattern is output and verifying whether the screen is normally output based on the detected illuminance value.

In some embodiments, the method may further comprises, accumulating and calculating an image output count indicating the number of times the image is normally output when verification of whether being normally output is successful; and outputting an advertisement cost calculated based on the image output count in response to advertisement period set for the image being over.

According to another aspect of the present discloser, a server may comprises a processor and a memory for storing at least one program executed by the processor, wherein the at least one program may comprises instructions for performing operations may comprises, inserting a checksum pattern for determining whether a screen is normally output into a partial region of image data, transmitting the image data, into which the checksum pattern is inserted, to a mobile image display apparatus, receiving an illuminance value from the mobile image display apparatus, determining whether a pattern of the illuminance value is a normal pattern by comparing the pattern of the illuminance value with the checksum pattern and stopping image reproduction of the mobile image display apparatus in response to the pattern of the illuminance value being not a normal pattern.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
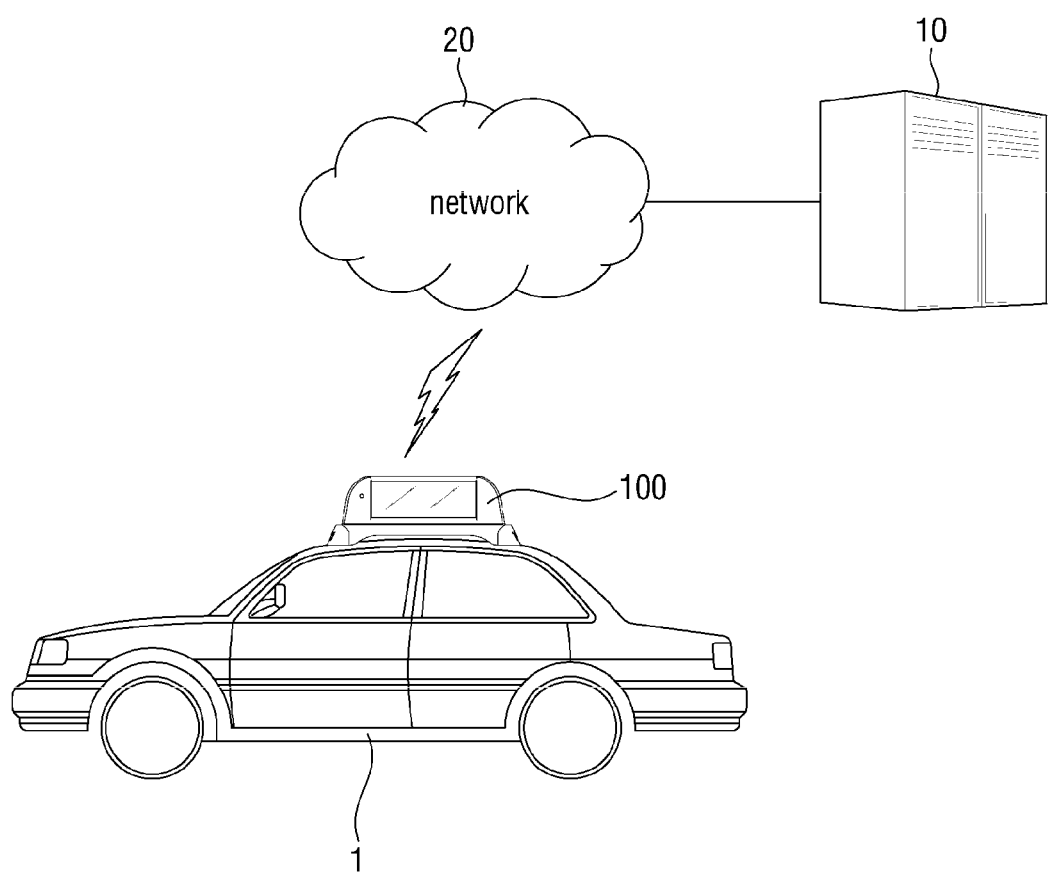
FIG. 1 is a diagram illustrating a system for displaying an image, according to some embodiments.

Hereinafter, preferred embodiments of the present invention will be described in detail with reference to the accompanying drawings. Advantages and features of the present invention, and a method of achieving them will become apparent with reference to the embodiments described below in detail in conjunction with the accompanying drawings. However, the present invention is not limited to the embodiments disclosed below, but may be implemented in various different forms, and these embodiments are provided only to allow the disclosure of the present invention to be complete, and fully inform those of ordinary skill in the technical field to which the present invention pertains on the scope of the invention, and the present invention is only defined by the scope of the claims. Like reference numerals refer to like elements throughout.

Unless otherwise defined, all terms (including technical and scientific terms) used herein may be used with the meaning commonly understood by those of ordinary skill in the art to which the present invention pertains. In addition, terms defined in a commonly used dictionary are not to be interpreted ideally or excessively unless clearly defined in particular. The term used herein is for the purpose of describing the embodiments and is not intended to limit the present invention. In this specification, the singular also includes the plural, unless specifically stated otherwise in the phrase.

Hereinafter, some embodiments of the present invention will be described with reference to the drawings.

FIG. 1 is a diagram illustrating a system for displaying an image, according to some embodiments.

According to some embodiments, a system for displaying an image may include the server 10 and the mobile image display apparatus 100 capable of communicating with the server 10 through the network 20.

The mobile image display apparatus 100 may be configured in a form that can be attached to the moving means 1 such as a vehicle. For example, the mobile image display apparatus 100 may be configured to have a display on at least one surface of a sign indicating that the moving means 1 is a taxi.

Figure 2:
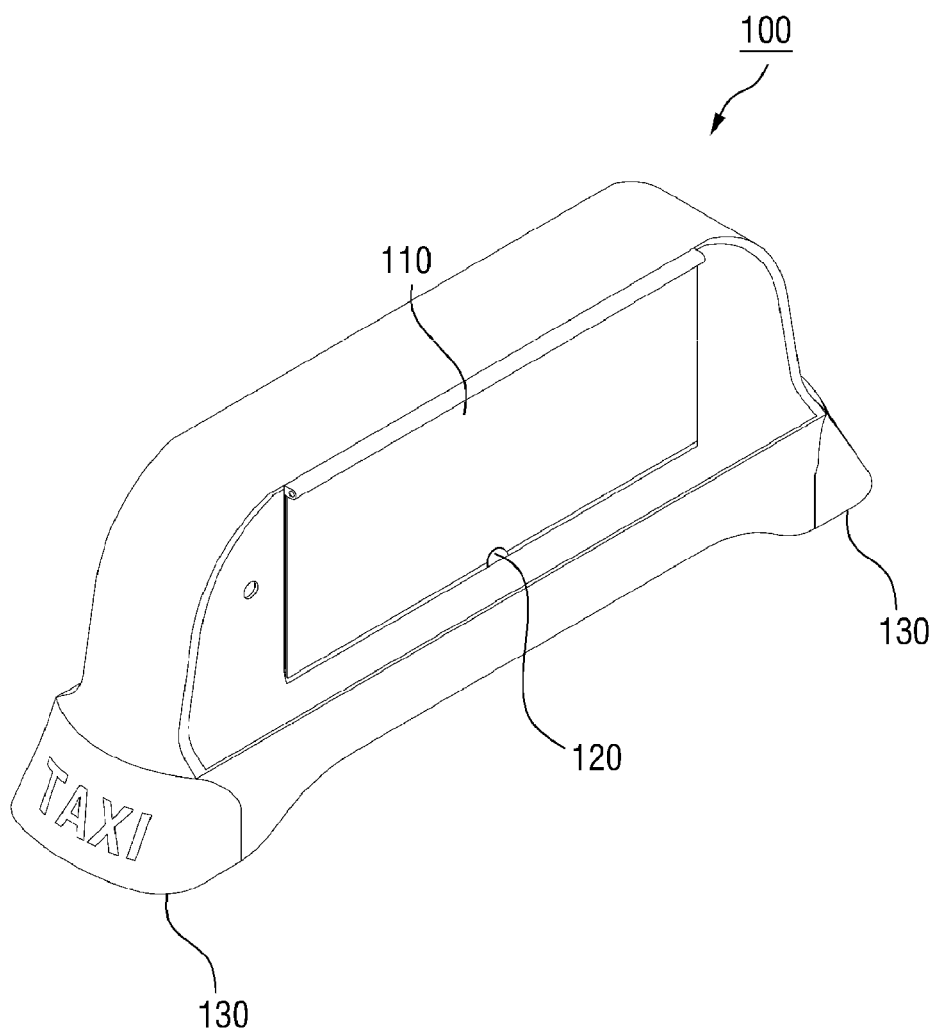
FIG. 2 is a diagram illustrating a perspective view of a mobile image display apparatus according to some embodiments.
Figure 3:
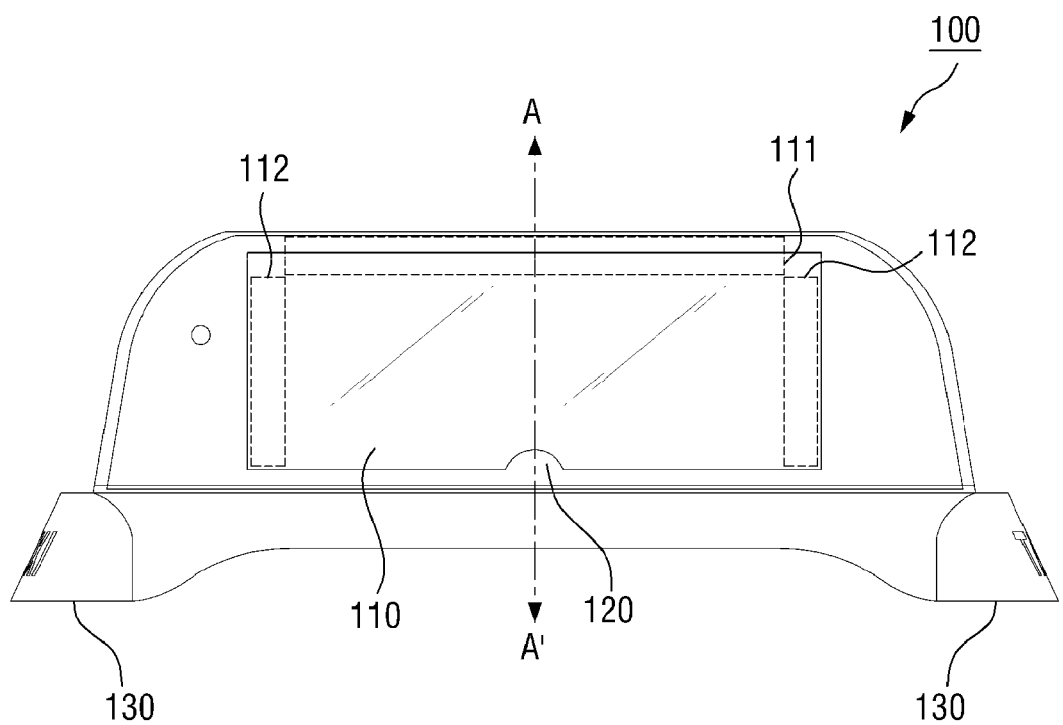
FIG. 3 is a diagram illustrating a right side view of a mobile image display apparatus according to some embodiments.

Referring to FIGS. 2 and 3, the mobile image display apparatus 100 according to some embodiments may include a display 110, an illuminance sensor 120, and a fixing unit 130. In addition, the mobile image display apparatus 100 may further include the processor 170 shown in FIG. 9 therein. The illuminance sensor 120 is an example of a sensor for detecting an illuminance value, and throughout this specification, the illuminance sensor 120 may be replaced with another sensor capable of detecting an illuminance value, such as a camera.

The display 110 may display an image when the processor 170 reproduces image data. For example, the display 110 may include a liquid crystal display (LCD) panel to display an image. The LCD panel may display an image by controlling the transparency of the LCD and transmitting light emitted from the backlight to the LCD. The backlight may include, for example, at least one of a light emitting diode (LED), a cold cathode fluorescent lamp (CCFL), a hot cathode fluorescent lamp (HCFL), a hot cathode fluorescent lamp (HCFL), a surface-conduction electron-emitter display (SED), and a field emission display (FED). The LCD panel may include a driving unit for driving the backlight. As another example, the display 110 may include an organic light emitting diode (OLED) panel to display an image. The OLED panel may display an image by emitting OLED by itself. The OLED panel may include, for example, a driving unit for driving the OLED. As another example, the display 110 may include a plasma display panel (PDP) to display an image. The PDP panel may display an image by inducing a plasma phenomenon by applying a voltage to an electrode connected to a gas (e.g., neon, argon) tube. However, the present invention is not limited thereto, and the display 110 may be configured in another form capable of displaying an image.

The illuminance sensor 120 may be located in front of the surface, on which the screen of the display 110 is displayed. The illuminance sensor 120 may detect an illuminance value of the surface, on which the screen of the display 110 is displayed. For example, the illuminance sensor 120 may generate a voltage according to the brightness of the light when light is detected using a photocell or a phototube.

As shown in FIGS. 2 and 3, the illuminance sensor 120 may be located at the front lower portion of the surface, on which the image of the display 110 is displayed. Since the display 110 is used in various outdoor environments, a malfunction may occur or performance may deteriorate. For example, the display 110 may not normally display an image due to a blackening phenomenon, in which the screen of the display turns black due to heat generated by use. Here, in order to prevent the performance of the display 110 from being deteriorated due to the blackening phenomenon, a heat sink may be installed in the upper portion 111 or the lower portion 112 of the display 110 shown in FIG. 3. However, it is difficult to install a heat sink at the lower portion of the display 110 due to the structure of the mobile image display apparatus 100. Accordingly, the region where the performance degradation or failure of the display 110 is most likely to occur is the lower region of the display 110. Accordingly, the illuminance sensor 120 may be located at the front lower portion of the surface, on which the image of the display 110 is displayed, as shown in FIGS. 2 and 3, to detect the illuminance value for detecting whether the image is normally output.

Figure 4:
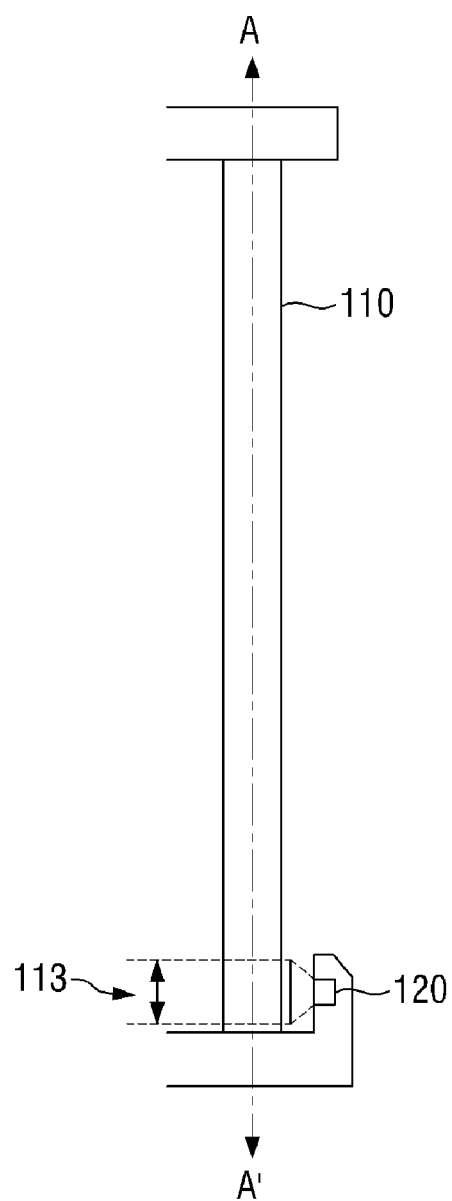
FIG. 4 is a diagram schematically illustrating a cross-section for describing a position of a display and an illuminance sensor according to some embodiments.

FIG. 4 is a diagram schematically illustrating a cross section A-A' of FIG. 3. Referring to FIG. 4, the illuminance sensor 120 may calculate an illuminance value for the checksum region 113, in which the checksum pattern inserted into the image is displayed among the portions where the screen is displayed on the display 110. In FIG. 4, the illuminance sensor 120 is spaced apart from the display 110 by a certain distance, but according to an embodiment, the illuminance sensor 120 is in close contact with the display 110 or a path of light may be formed separately between the illuminance sensor 120 and the checksum region 113.

The fixing unit 130 may include means for fixing the mobile image display apparatus 100 to the moving means 1 and supporting the mobile image display apparatus 100. For example, the fixing unit 130 may be coupled to the upper end of the moving means 1 through a bolt-nut coupling with a cavity formed at the lower end. However, the present invention is not limited thereto, and the fixing unit 130 may use other means such as an adhesive to fix the mobile image display apparatus 100 to the moving means 1.

Figure 5:
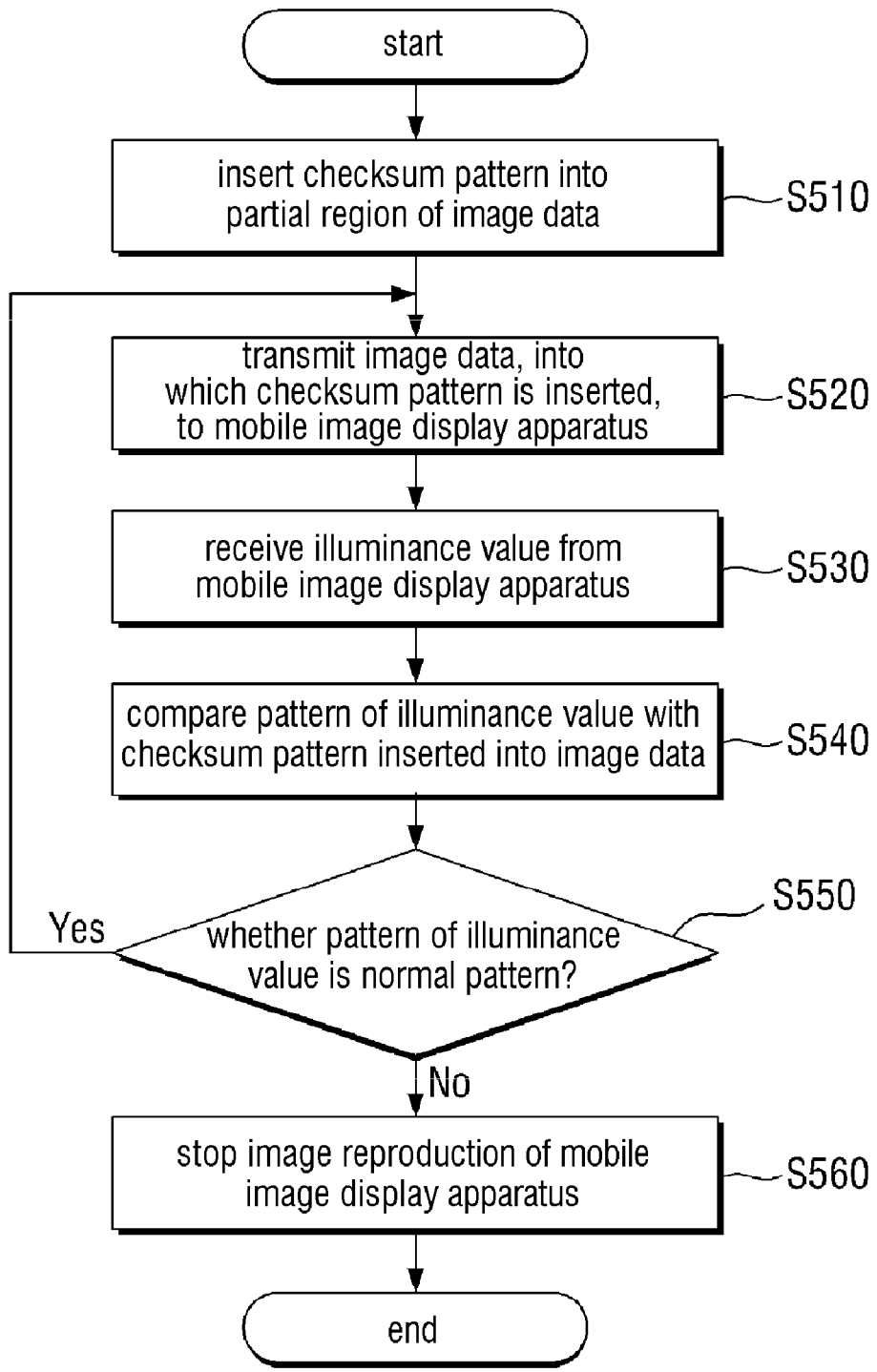
FIG. 5 is a diagram illustrating a process, in which a server reproduces an image through a mobile image display apparatus, according to some embodiments.

FIG. 5 is a diagram illustrating a process, in which a server inserts a checksum pattern into an image and reproduces the image through a mobile image display apparatus, according to some embodiments.

According to some embodiments, the server 10 may register image data to be reproduced through the mobile image display apparatus 100. That is, when an advertiser requests an advertisement through an advertisement image to the operator of the server 10, the operator may register the advertisement image in the server 10.

In step S510, the server 10 may insert a checksum pattern into a partial region of the registered image data. For example, referring to FIG. 6, the server 10 may generate an image 60-2, in which a checksum pattern is inserted in a specific region 61 with respect to an original image 60-1.

Here, the region, to which the checksum pattern is input, may be determined according to the size, shape, or performance of the display 110 and the illuminance sensor 120 of the mobile image display apparatus 100. For example, the server 10 may store a pattern region table that matches identification information of the mobile image display apparatus 100 and information on a region, to which a checksum pattern is input, and input a checksum pattern by referring to the pattern region table when inputting the checksum pattern to an image to be transmitted to the mobile image display apparatus 100. For another example, the server 10 may search for the size, shape, or performance of the display 110 and the illuminance sensor 120 of the mobile image display apparatus 100, and determine a region, to which a checksum pattern is input, based on the search result.

Figure 6:
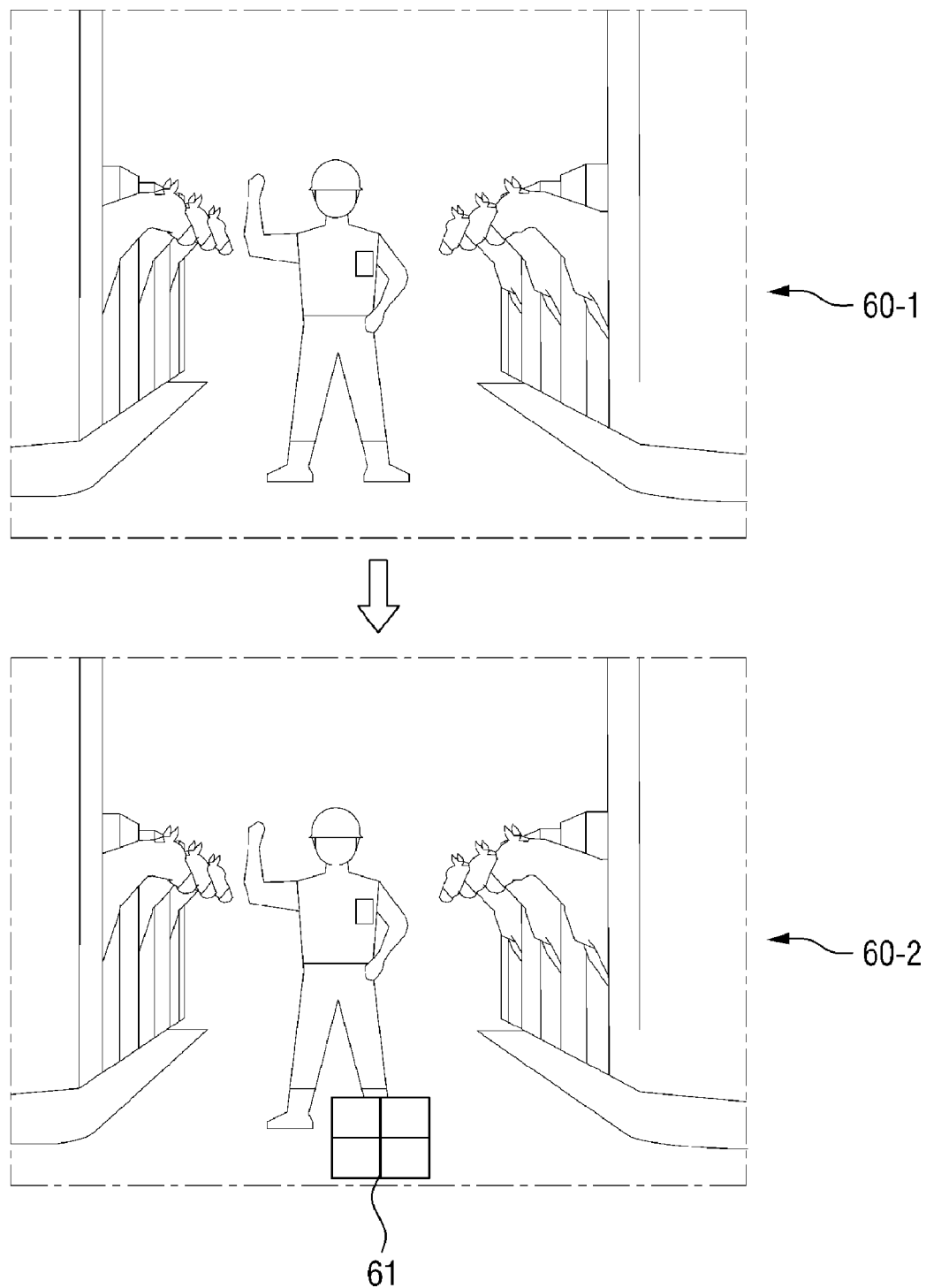
FIG. 6 is a diagram illustrating a concept for describing a checksum pattern inserted into an image according to some embodiments.

Also, as shown in FIG. 6, the checksum pattern may be a pattern 61 in a separate form that is distinct from the original image 60-1, but according to another embodiment, the server 10 may use the original image 60-1 itself or a pixel of a partial region of the original image 60-1 as a checksum pattern.

Figure 7:
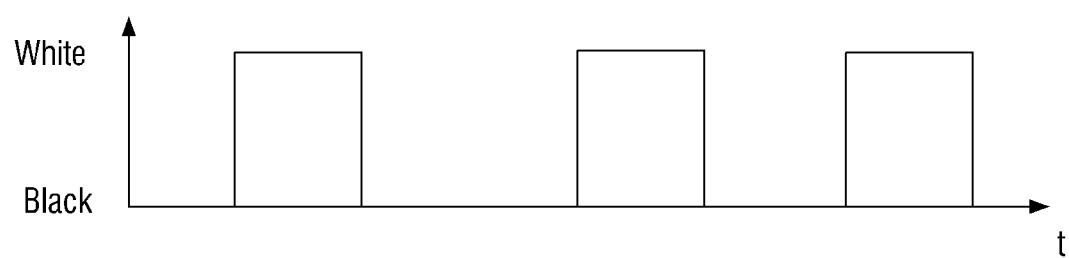
FIG. 7 is a diagram illustrating a graph for describing a checksum pattern according to time to be inserted into an image according to some embodiments.

According to some embodiments, as shown in FIG. 7, the checksum pattern may be one, in which white pixels or black pixels are alternately inserted into the region where the checksum pattern is inserted according to time. Also, according to some embodiments, the checksum pattern may be generated based on a first rule set not to be changed in the server 10 and a second rule set to be updateable. For example, the first rule may be one that the white pixel is maintained for 1 second when a white pixel is inserted, and the second rule may be one that a pattern, in which time points at which the white pixel starts to be inserted are repeated, is set.

Thereafter, in step S520, the server 10 may transmit the image data, in which the checksum pattern is inserted, to the mobile image display apparatus 100. A method of transmitting image data to the mobile image display apparatus 100 may be configured in various ways according to embodiments. For example, the server 10 may transmit an image so as to be reproduced in real time in a streaming manner, or may transmit an image data file.

According to some embodiments, when receiving an image transmission request from the mobile image display apparatus 100, the server 10 may transmit image data to the mobile image display apparatus 100 in response to the image transmission request.

Alternatively, according to some other exemplary embodiments, the server 10 may receive position information on the mobile image display apparatus 100 from the mobile image display apparatus 100. Also, the server 10 may set information on a position to reproduce the image data for the image data registered in the server 10. When there is image data, in which position information corresponding to the position information received from the mobile image display apparatus 100 is set, the server 10 may transmit the image data to the mobile image display apparatus 100.

Thereafter, information on the illuminance value may be received from the mobile image display apparatus 100 that has transmitted the image data in step S530. The server 10 may compare the pattern of the illuminance value received in step S540 with the checksum pattern inserted into the image data transmitted to the mobile image display apparatus 100. Here, according to some embodiments, the server 10 may determine that the pattern of the illuminance value is a normal pattern when the pattern of the illuminance value satisfies the rule used to generate the checksum pattern. For example, when a white pixel is output to the checksum region, a relatively high illuminance value may be detected by the illuminance sensor 120 compared to other time points. Therefore, the server 10 may determine that the pattern of the illuminance value is a normal pattern when the similarity between the pattern indicated by the time point when the white pixel is inserted into the checksum region of the image data and the pattern indicated by the time point when the high illuminance value is detected is equal to or greater than the threshold value.

When the illuminance value pattern is a normal pattern in step S550, the server 10 may continue to transmit the image data in step S520.

When the illuminance value pattern is not a normal pattern, the server 10 may stop image reproduction of the mobile image display apparatus 100 in step S560. For example, when the mobile image display apparatus 100 reproduces an image in a streaming manner, the server 10 may stop transmitting image data. As another example, when an image stored in the mobile image display apparatus 100 is being reproduced, the server 10 may transmit a command to stop image reproduction to the mobile image display apparatus 100.

Figure 8:
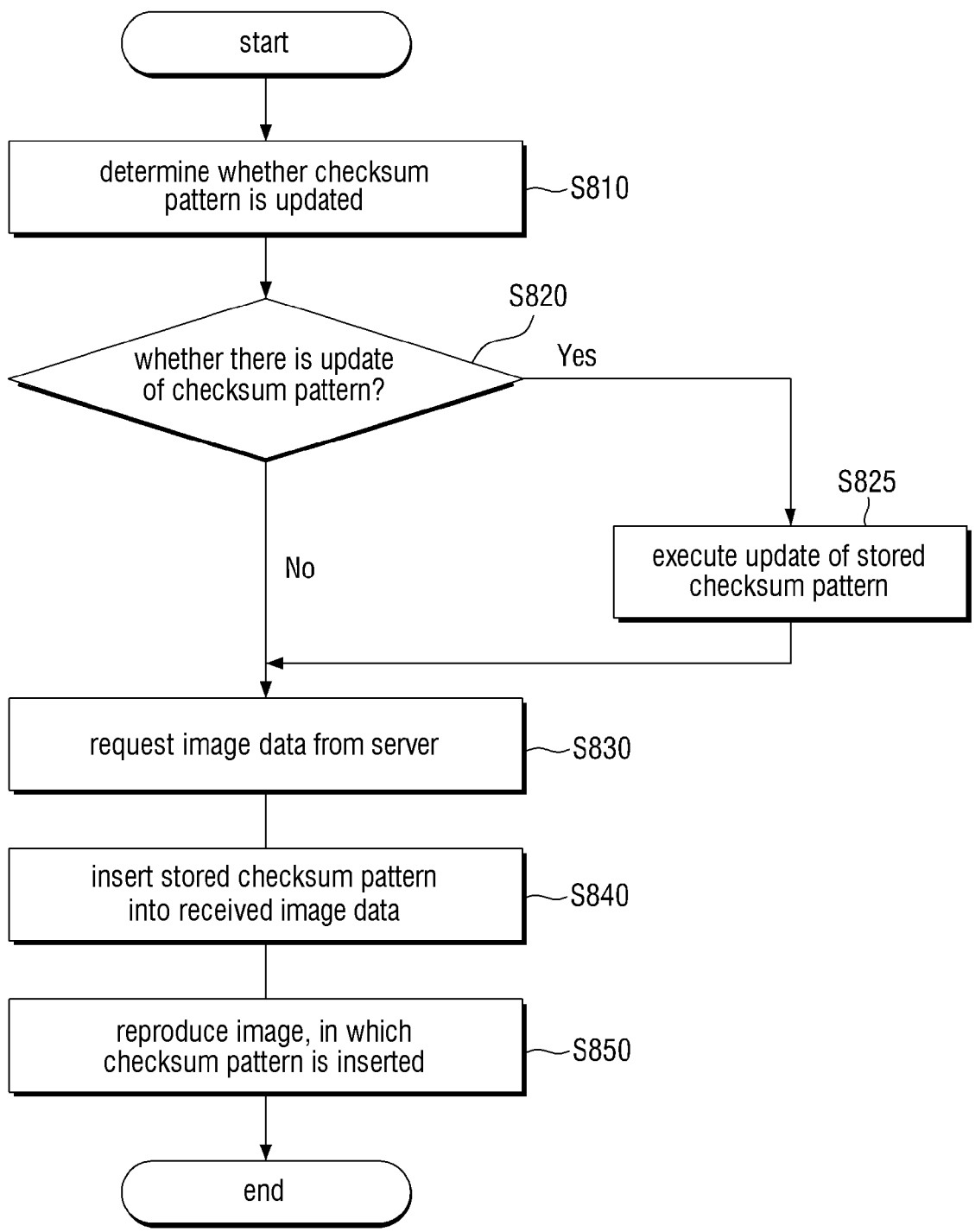
FIG. 8 is a diagram illustrating a process of displaying an image by a mobile image display apparatus according to some embodiments.

FIG. 8 is a diagram illustrating a process, in which a mobile image display apparatus inserts a checksum pattern into an image and displays the image, according to some embodiments.

First, in step S810, the mobile image display apparatus 100 may determine whether a checksum pattern stored in the mobile image display apparatus 100 is updated. For example, the version information of the checksum pattern stored in the mobile image display apparatus 100 and the version information of the checksum pattern set in the server 10 may be identified, and if the version information does not match, it may be determined that there is an update.

Thereafter, when it is determined that there is an update of the checksum pattern in step S820, the mobile image display apparatus 100 may update the checksum pattern in step S825.

According to an embodiment, steps S810 to S825 may be replaced with a process of updating an updateable rule among rules for generating a checksum pattern rather than the checksum pattern itself.

Thereafter, in step S830, the mobile image display apparatus 100 may request image data from the server 10. Here, the mobile image display apparatus 100 may transmit a request for image data to the server 10 when the image data reproduction condition is satisfied. The image data reproduction condition may be set in various ways according to embodiments. For example, when position information for displaying an image is set in the mobile image display apparatus 100, the mobile image display apparatus 100 may compare position information obtained using a GSP sensor or a wireless LAN AP and the set position information to determine whether to transmit a request for image data. In this case, the mobile image display apparatus 100 may transmit the obtained position information to the server 10 to receive image data according to the position of the mobile image display apparatus 100 from the server 10.

According to another embodiment, in step S830, the mobile image display apparatus 100 may transmit information indicating the context of the mobile image display apparatus 100 to the server 10 instead of a separate request. For example, when the mobile image display apparatus 100 transmits information about the position of the mobile image display apparatus 100 or information on the number or types of other devices detected around the mobile image display apparatus 100, weather, etc. to the server 10, the server 10 may transmit the image data selected according to a result of analyzing the received information from the mobile image display apparatus 100 to the mobile image display apparatus 100.

Thereafter, in step S840, the mobile image display apparatus 100 may insert the checksum pattern stored in the mobile image display apparatus 100 into the image data received from the server 10. According to another embodiment, when a rule for generating a checksum pattern is stored, the mobile image display apparatus 100 may generate a checksum pattern according to the stored rule and insert the generated checksum pattern into the image data.

According to some embodiments, after the image player installed in the mobile image display apparatus 100 determines whether the received image data is legitimate content according to Digital Rights Management (DRM) applied to the received image data, only if it is determined that it is the legitimate content, step S840 may be performed.

Thereafter, in step S850, the mobile image display apparatus 100 may reproduce image data, in which the checksum pattern is inserted, so that the image is displayed through the display 110.

Figure 9:
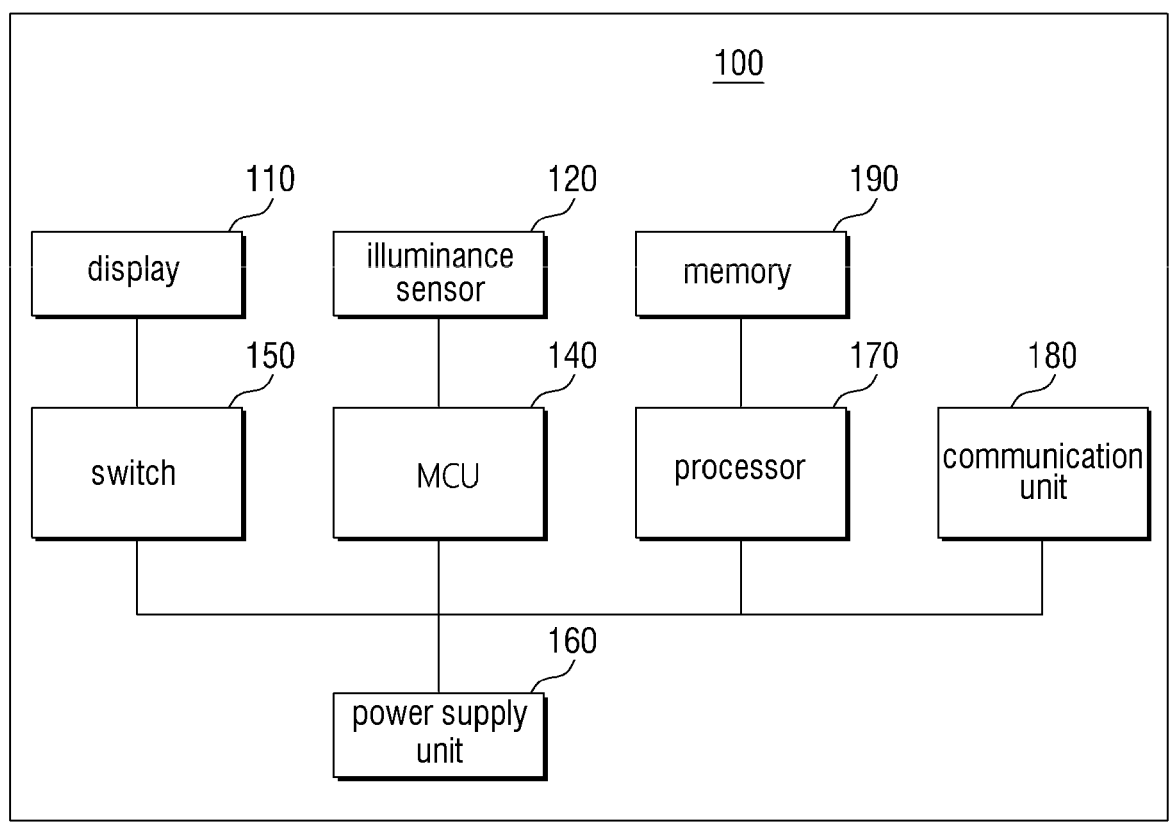
FIG. 9 is a block diagram simply illustrating a structure of a mobile image display apparatus according to some embodiments.

FIG. 9 is a block diagram simply illustrating a structure of a mobile image display apparatus according to some embodiments.

The mobile image display apparatus 100 according to some embodiments may include a processor 170 that inserts a checksum pattern into image data, reproduces the image data, into which the checksum pattern is inserted, and controls components of the mobile image display apparatus 100, a display 110 that displays an image, into which the checksum pattern is inserted, and an illuminance sensor 120 that detects an illuminance value of a position where the checksum pattern is displayed on the display 110.

The mobile image display apparatus 100 may further include a micro controller unit (MCU) 140 connected to the illuminance sensor 120 to receive an illuminance value. The micro controller unit 140 may receive the illuminance value from the illuminance sensor 120 and transmit it to the processor 170. The micro controller unit 140 is distinguished from the board, on which the processor 170 is mounted, and may be provided on the board, on which the illuminance sensor 120 is mounted. However, this is not distinguished, and according to another embodiment, the micro controller unit 140 may be configured as one piece of hardware with the processor 170.

According to some embodiments, the micro controller unit 140 may be embedded in the mobile image display apparatus 100 to execute logic for determining validity according to a pattern of an illuminance value. Here, the logic embedded in the micro controller unit 140 cannot be arbitrarily changed. Therefore, even if hacking is attempted, an external intruder cannot change it.

In addition, when the checksum pattern inserted into the image data is generated based on a first rule set not to be changed and a second rule set to be updatable, the logic embedded in the micro controller unit 140 may be logic to determine whether the pattern of the illuminance value is valid according to the first rule. For example, if the first rule is one that a white pixel is maintained for 1 second when a white pixel is inserted, when an illuminance value is input to the logic embedded in the micro controller unit 140, it may be determined whether the pattern of the illuminance value is a normal pattern according to whether the period of the illuminance value greater than or equal to the threshold being maintained is within a predetermined range from 1 second. However, the present invention is not limited thereto.

When it is determined that the illuminance value pattern is not a normal pattern according to the embedded logic, the micro controller unit 140 may cut off the power supplied from the power supply unit 160 to the display device 110. For example, when the switch 150 is provided in the path for supplying power from the power supply unit 160 to the display 110, the micro controller unit 140 may control the switch 150 to cut off the power supplied to the display 110. For another example, the micro controller unit 140 may transmit a command to the power supply unit 160 to cut off the power supplied to the display 110. However, the method of cutting off the power supplied to the display 110 is not limited thereto.

When the pattern of the illuminance value is determined to be a normal pattern according to the embedded logic, the micro controller unit 140 may deliver the illuminance value to the processor 170. The processor 170 may control each component of the mobile image display apparatus 100. Also, the processor 170 may execute an operating system for operating the mobile image display apparatus 100. The processor 170 may reproduce the image data received from the server 10 to display the image including the checksum pattern through the display 110. Here, the processor 170 may insert a checksum pattern into the image data, or may receive image data, into which the checksum pattern is inserted by the server 10, from the server 10.

The processor 170 may execute logic installed in the memory 190 based on the operating system of the mobile image display apparatus 100 to determine whether the pattern of the illuminance value is normal, that is, whether it is valid. Here, the logic installed based on the operating system may be updateable from the server 10. When the checksum pattern inserted into the image data is generated based on the first rule that cannot be changed and the second rule that is set to be updatable, the logic installed based on the operating system may be one that determines whether the pattern of the illuminance value is normal based on the second rule.

The memory 190 may store a program including instructions for executing the operation of the mobile image display apparatus 100. The mobile image display apparatus 100 may include one or more memories 190 such as a RAM, a flash memory, a hard disk, a solid state disk (SSD), or a ROM. In this specification, the memory 190 is meant to include one or more of a transitory storage medium and a non-transitory storage medium.

According to some embodiments, the memory 190 may store a checksum pattern to be inserted into an image or a rule for generating a checksum pattern. The checksum pattern stored in the memory 190, the rule for generating the checksum pattern, and the logic for verifying the updateable checksum pattern may be updated under the control of the processor 170.

The communication unit 180 may transmit data to or receive data from the server 10 under the control of the processor 170. For example, the communication unit 180 may include a mobile communication module, a short-range wireless communication module, or a wireless LAN module. In addition, when it is determined that the checksum pattern of the image output by the micro controller unit 140 or the processor 170 is not normal, the communication unit 180 may transmit information indicating that the image output is not normally performed to the server 10.

In addition, when the mobile image display apparatus 100 according to some embodiments stores the checksum pattern in the memory 190 and inserts it into the image, the communication unit 180 receives information for updating the checksum pattern from the server 10.

According to some other exemplary embodiments, the mobile image display apparatus 100 may transmit information about the illuminance value to the server 10 without directly determining whether the pattern of the illuminance value is a normal pattern. In this case, the server 10 may control the image reproduction of the mobile image display apparatus 100 by determining whether the pattern of the illuminance value is normal.

Figure 10:
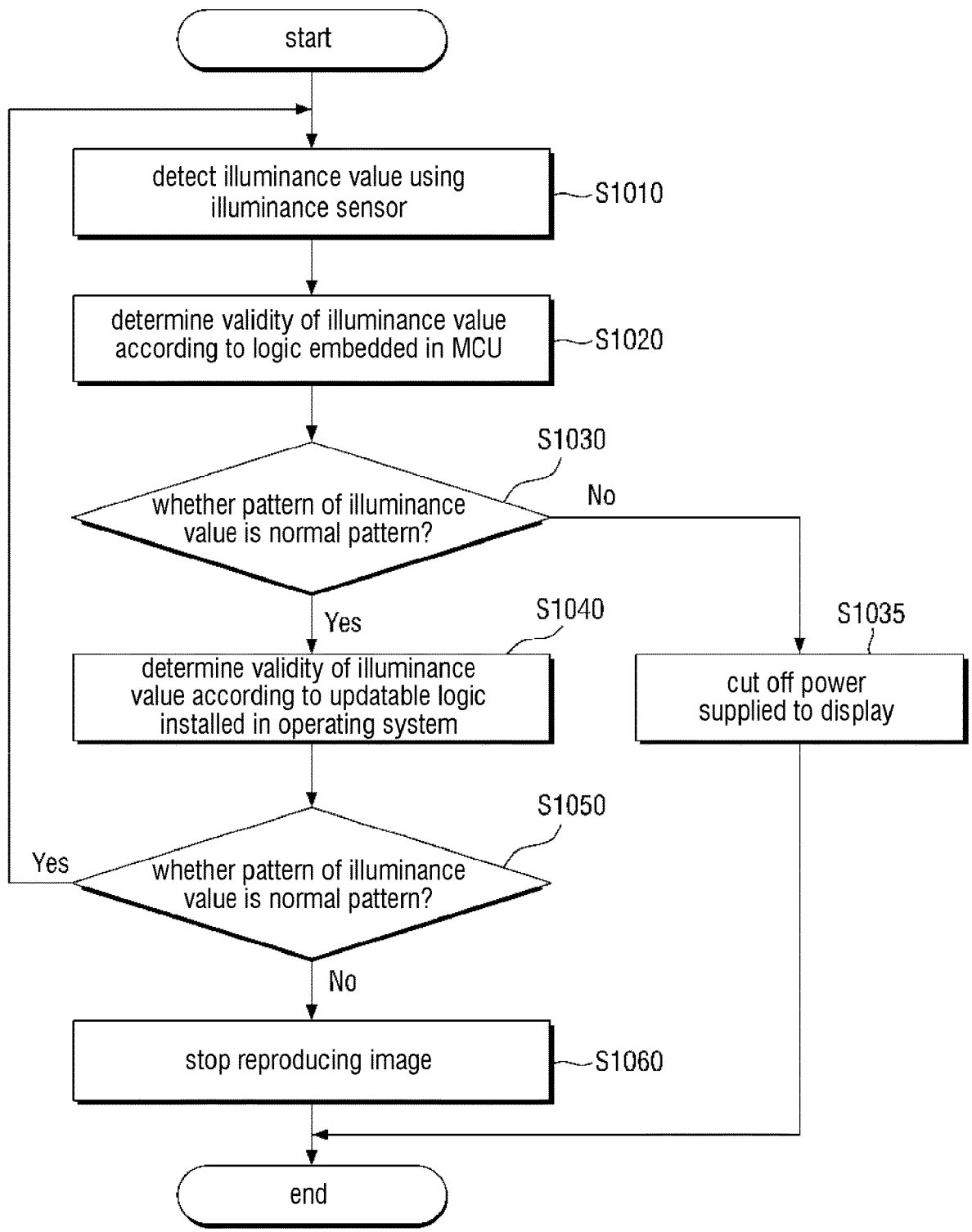
FIG. 10 is a diagram illustrating a process of detecting and blocking a displayed abnormal image by a mobile image display apparatus according to some embodiments.

FIG. 10 is a diagram illustrating a process of a mobile image display apparatus detecting and blocking a displayed abnormal image according to some embodiments.

The mobile image display apparatus 100 may reproduce image data provided from the server 10. Thereafter, in step S1010, the mobile image display apparatus 100 may detect an illuminance value using the illuminance sensor 120. The illuminance value detected by the illuminance sensor 120 may be transmitted to the micro controller unit 140.

Thereafter, in step S1020, the mobile image display apparatus 100 may determine the validity of the illuminance value according to the embedded logic. That is, the mobile image display apparatus 100 may determine whether the pattern of the illuminance value is a normal pattern. Here, the embedded logic may be hardware-fixed so that it cannot be arbitrarily changed.

According to some embodiments, when the checksum pattern inserted into the image data is generated based on a first rule set not to be changed and a second rule set to be updateable, the embedded logic may be a logic to determine whether the pattern of the illuminance value is valid according to the first rule. For example, if the first rule is one that a white pixel is maintained for 1 second when a white pixel is inserted, the mobile image display apparatus 100 may determine whether the pattern of the illuminance value is a normal pattern according to whether the period of the illuminance value greater than or equal to the threshold being maintained is within a predetermined range from 1 second when an illuminance value is input to the embedded logic. However, the method of determining the validity of the illuminance value using the embedded logic is not limited thereto.

Thereafter, when it is determined in step S1030 that the pattern of the illuminance value is not a normal pattern, the mobile image display apparatus 100 may cut off the power supplied to the display in step S1035. According to some embodiments, step S1035 may be performed by logic configured in hardware so that it cannot be changed even if there is a hacking attack.

When it is determined that the pattern of the illuminance value is a normal pattern according to the embedded logic in step S1030, the mobile image display apparatus 100 may determine the validity of the illuminance value according to the updateable logic installed based on the operating system of the mobile image display apparatus 100 in step S1040. Here, the logic installed based on the operating system may be updateable from the server 10. When the checksum pattern inserted into the image data is generated based on the first rule that cannot be changed and the second rule that is set to be updatable, the logic installed based on the operating system may be one that determines whether the pattern of the illuminance value is normal is based on the second rule.

When it is determined that the pattern of the illuminance value is a normal pattern as a result of executing the logic installed based on the operating system in step S1050, the mobile image display apparatus 100 continues to reproduce the image, and repeats step S1010 to monitor whether the image is normally reproduced.

If it is determined in step S1050 that the pattern of the illuminance value is not a normal pattern, in step S1060 the mobile image display apparatus 100 may stop reproducing the image being reproduced. Here, the mobile image display apparatus 100 may stop reproducing the image through a software operation. However, the present invention is not limited thereto.

Figure 11:
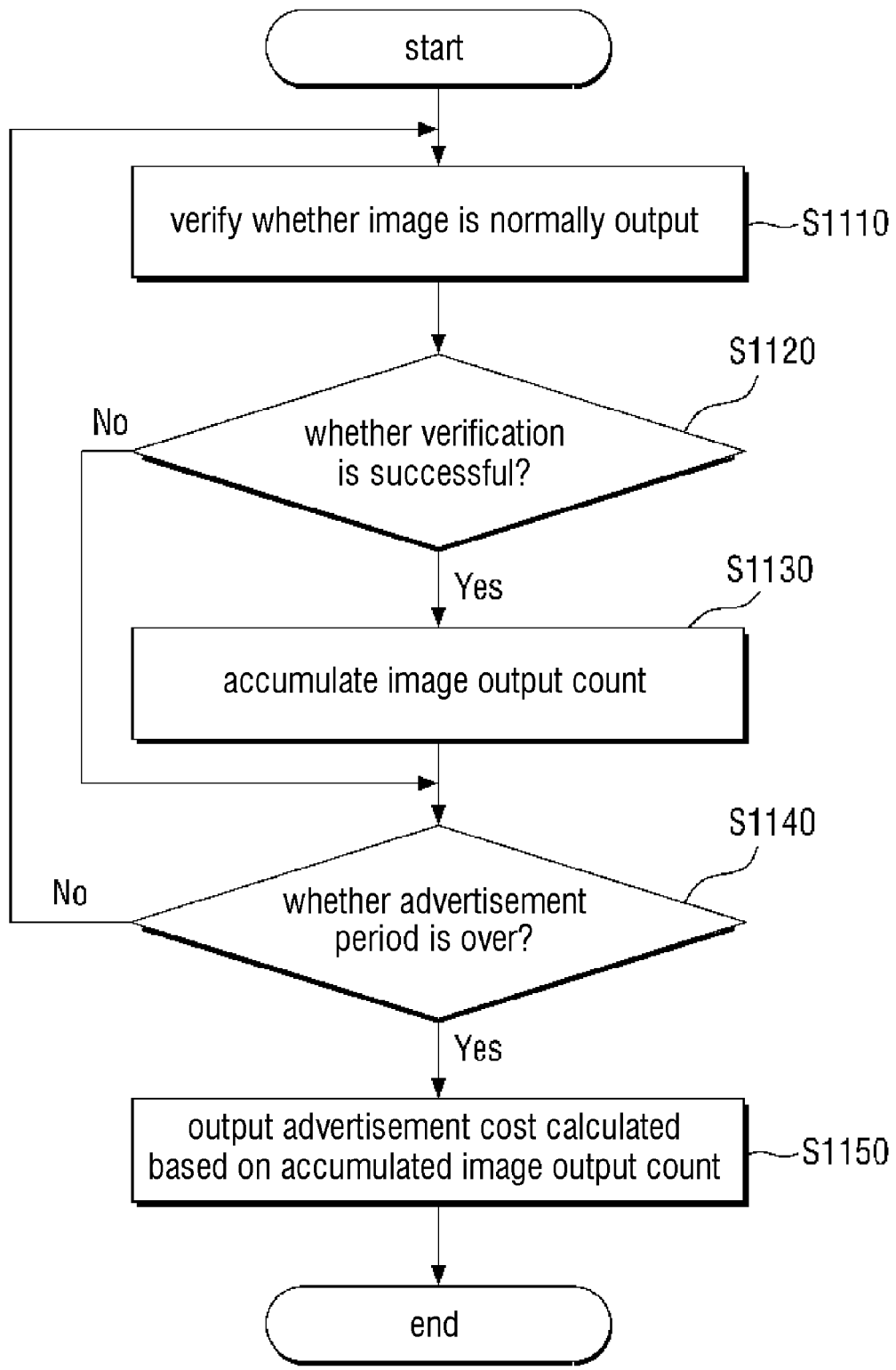
FIG. 11 is a diagram illustrating a process of calculating an advertisement cost according to some embodiments.

FIG. 11 is a diagram illustrating a process of calculating an advertisement cost according to some embodiments. The process shown in FIG. 11 may be performed by one or more of the server 10 and the mobile image display apparatus 100 included in the system for displaying an image.

First, in step S1110, the system may verify whether an image is normally output. Here, verifying whether an image is normally output may be performed through the execution of the process shown in FIG. 5 or the process shown in FIG. 10. Alternatively, it may be performed according to another embodiment included in the scope of the inventive concept using a checksum pattern and an illuminance value.

In addition, according to some embodiments, in order to verify whether the image is normally output, the system may calculate the ratio of the time that the state, in which the pattern of the detected illuminance value is determined to a normal pattern, is maintained with respect to the reproduction time of the image data. The system may determine that the image is normally output only when the calculated ratio is equal to or greater than the threshold value. The total reproduction time of the image data may be included in the metadata of the image data.

Thereafter, when it is successful in verifying that the image is normally output in step S1120, the system may accumulate and increase the image output count. Here, the image output count may have a value indicating the number of times an image is normally output.

Thereafter, in step S1140, the system may determine whether the advertisement period for the reproduced image is over. In the image data registered in the server 10, the advertisement period requested by the advertiser may be set respectively. When the advertisement period for the reproduced image is over, the system may calculate an advertisement cost based on the image output count accumulated in step S1150 and output the calculated advertisement cost. For example, if the number of times to attempt to reproduce an image is 10 times, the number of times that the image is verified as being normally output is 7, and the advertisement cost per number of exposures of the image is 10,000 won, the system may output a final advertisement cost as 70,000 won.

Alternatively, according to another exemplary embodiment, the advertisement cost per number of exposures of the image may be set differently according to the time or position at which the image is reproduced. In this case, the server 10 may receive from the mobile image display apparatus 100 at least one of time information and position information at a time when an image is reproduced. Here, the server 10 may calculate the advertisement cost based on at least one of the time information and the position information received in step S1150.

According to another exemplary embodiment, the system may calculate the advertisement cost according to the number of mobile communication terminals (not shown) located around the mobile image display apparatus 100 at the time the image is reproduced. In this case, the mobile image display apparatus 100 may search for connectable mobile communication terminals using short-range wireless communication (e.g., Wi-Fi communication) through a short-range wireless communication module (not shown) provided in the mobile image display apparatus 100 when reproducing an image and calculate the number of searched mobile communication terminals. The system may calculate the advertisement cost according to the number of mobile communication terminals calculated by the mobile image display apparatus 100.

Figure 12:
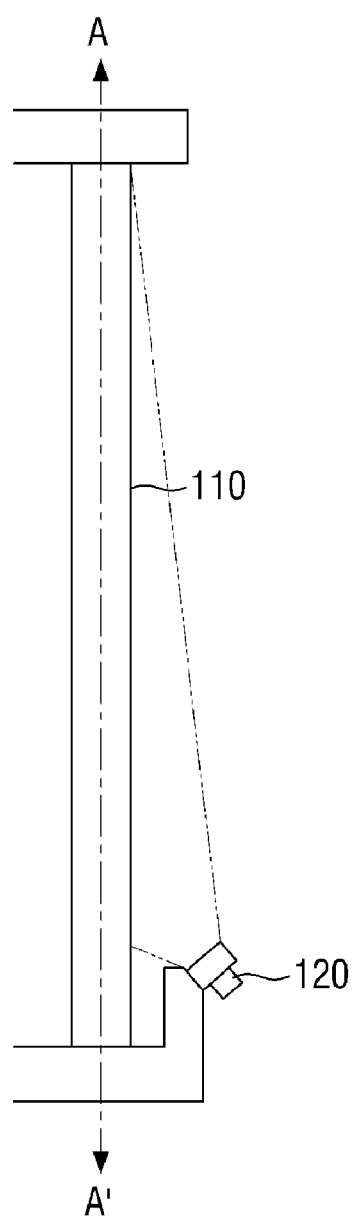
FIG. 12 is a schematic cross-sectional view for describing the positions of a display and an illuminance sensor according to another exemplary embodiment.
Figure 13:
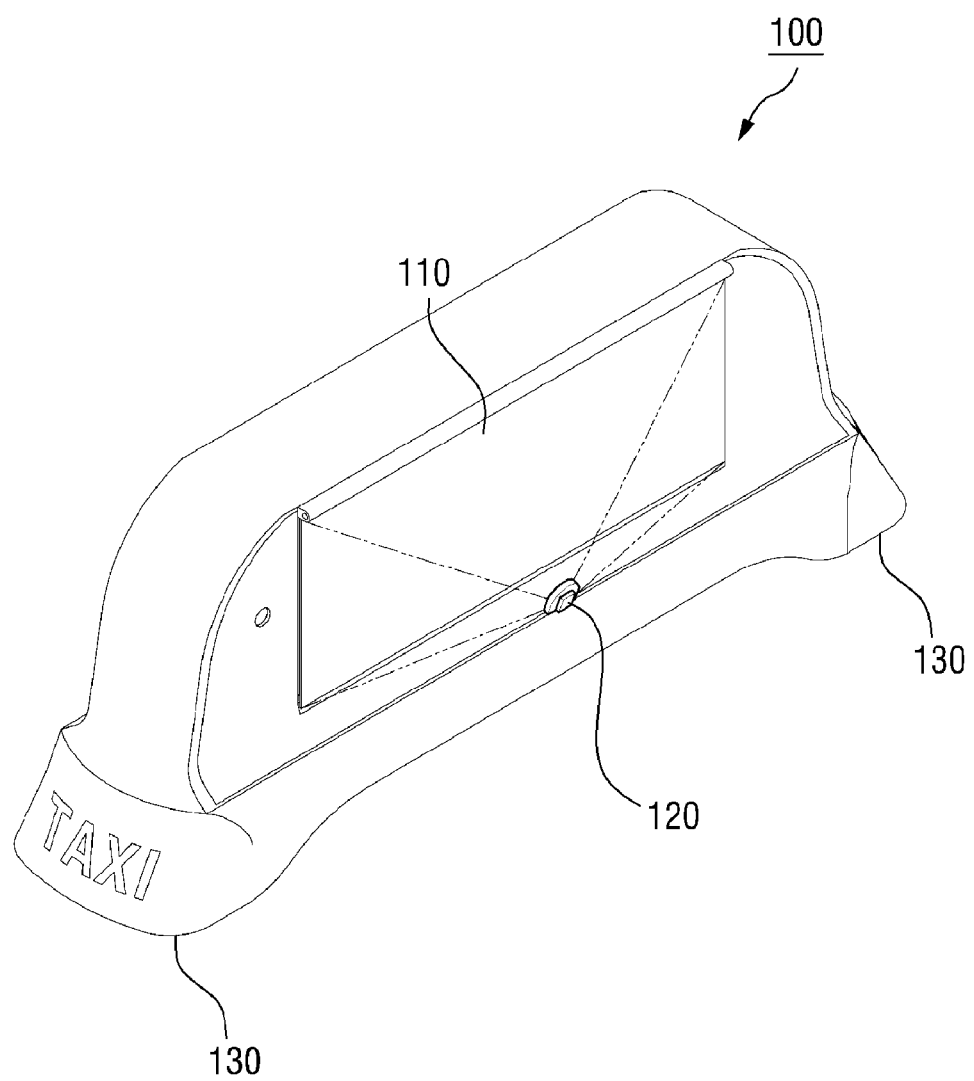
FIG. 13 is a diagram illustrating a perspective view of a mobile image display apparatus according to another exemplary embodiment.

Although the shape of the mobile video display apparatus 100 is illustrated in FIGS. 2 to 4, according to some other embodiments, the shape of the mobile image display apparatus 100 may be changed within the scope for implementing the inventive concept. For example, referring to FIGS. 12 and 13, the position of the illuminance sensor 110 may be disposed to detect an illuminance value for a wider area of the display 110 rather than a lower portion of the display 110.

The methods according to the embodiments of the present invention described so far may be performed by executing a computer program implemented as computer readable code. The computer program may be transmitted from the first computing device to the second computing device through a network such as the Internet and installed in the second computing device, thereby being used in the second computing device. The first computing device and the second computing device include all of a server device, a physical server belonging to a server pool for cloud services, and a stationary computing device such as a desktop PC.

The computer program may be stored in a recording medium such as a DVD-ROM or a flash memory device.

Although embodiments of the present invention have been described above with reference to the accompanying drawings, those of ordinary skill in the art to which the present invention pertains can understand that the present invention can be embodied in other specific forms without changing the technical spirit or essential features. Therefore, it should be understood that the embodiments described above are illustrative in all respects and not Limiting.

What is claimed is:

1. A mobile image display apparatus comprising:
   a fixing unit having a means capable of being fixed to a moving means;
   a display for displaying an image, in which a checksum pattern for determining whether a screen is normally output is inserted;
   a processor for reproducing image data so that the image is displayed through the display; and
   a sensor for detecting an illuminance value of a position where the checksum pattern is displayed by the display,
   wherein the sensor is installed facing an area where the checksum pattern is displayed, and
   wherein white pixels or black pixels are alternately inserted into the area where the checksum pattern is inserted according to time.

2. The mobile image display apparatus of claim 1, wherein the sensor is located in a front lower portion of a surface, on which the image is displayed with respect to the display.

3. The mobile image display apparatus of claim 2 further comprises:
a heat sink at an upper portion of the display.

4. The mobile image display apparatus of claim 1 further comprises:
a memory for storing the checksum pattern,
wherein the processor performs an update of the checksum pattern, and inserts the checksum pattern stored in the memory into the image data.

5. The mobile image display apparatus of claim 1 further comprises:
a communication unit for receiving image data for displaying the image and update data for updating logic installed in an operating system for verifying the checksum pattern from a server,
wherein the processor determines validity according to a pattern of the illuminance value by executing logic installed in the operating system, and stops reproduction of the image data in response to the pattern of the illuminance value being invalid.

6. The mobile image display apparatus of claim 5 further comprises:
a micro controller unit for determining validity of a pattern of an illuminance value according to an embedded logic when the sensor detects the illuminance value, cutting off power supplied to the display if the pattern of the illuminance value is invalid, and delivering the illuminance value to the processor if the pattern of the illuminance value is valid.

7. The mobile image display apparatus of claim 1 further comprises:
a communication unit for transmitting and receiving data with a server,
wherein the processor determines whether the image is normally output based on the illuminance value, and transmits the determined information on whether the image is normally output to the server through the communication unit.

8. A method for displaying an image using a mobile image display apparatus attached to a moving means comprising:
inserting a checksum pattern for determining whether a screen is normally outputted into image data;
displaying an image on the mobile image display apparatus by reproducing the image data, into which the checksum pattern is inserted;
detecting, using a sensor, an illuminance value of a position where the checksum pattern is output; and
verifying whether the screen is normally output based on the detected illuminance value,
wherein the sensor is installed facing an area where the checksum pattern is displayed, and
wherein white pixels or black pixels are alternately inserted into the area where the checksum pattern is inserted according to time.

9. The method of claim 8 further comprises:
accumulating and calculating an image output count indicating the number of times the image is normally output when verification of whether being normally output is successful; and
outputting an advertisement cost calculated based on the image output count in response to advertisement period set for the image being over.

10. A server comprising:
a processor; and
a memory for storing at least one program executed by the processor,
wherein the at least one program comprises instructions for performing operations comprising,
inserting a checksum pattern for determining whether a screen is normally output into a partial region of image data;
transmitting the image data, into which the checksum pattern is inserted, to a mobile image display apparatus;
receiving an illuminance value detected using a sensor from the mobile image display apparatus;
determining whether a pattern of the illuminance value is a normal pattern by comparing the pattern of the illuminance value with the checksum pattern; and
stopping image reproduction of the mobile image display apparatus in response to the pattern of the illuminance value being not a normal pattern,
wherein the sensor is installed facing an area where the checksum pattern is displayed, and
wherein white pixels or black pixels are alternately inserted into the area where the checksum pattern is inserted according to time.

* * * * *